Jan. 1, 1935.  J. HERBERT  1,985,925
PHOTOGRAPHIC PLATE ELEMENT AND PROCESS OF PREPARING SAME
Filed Nov. 27, 1931
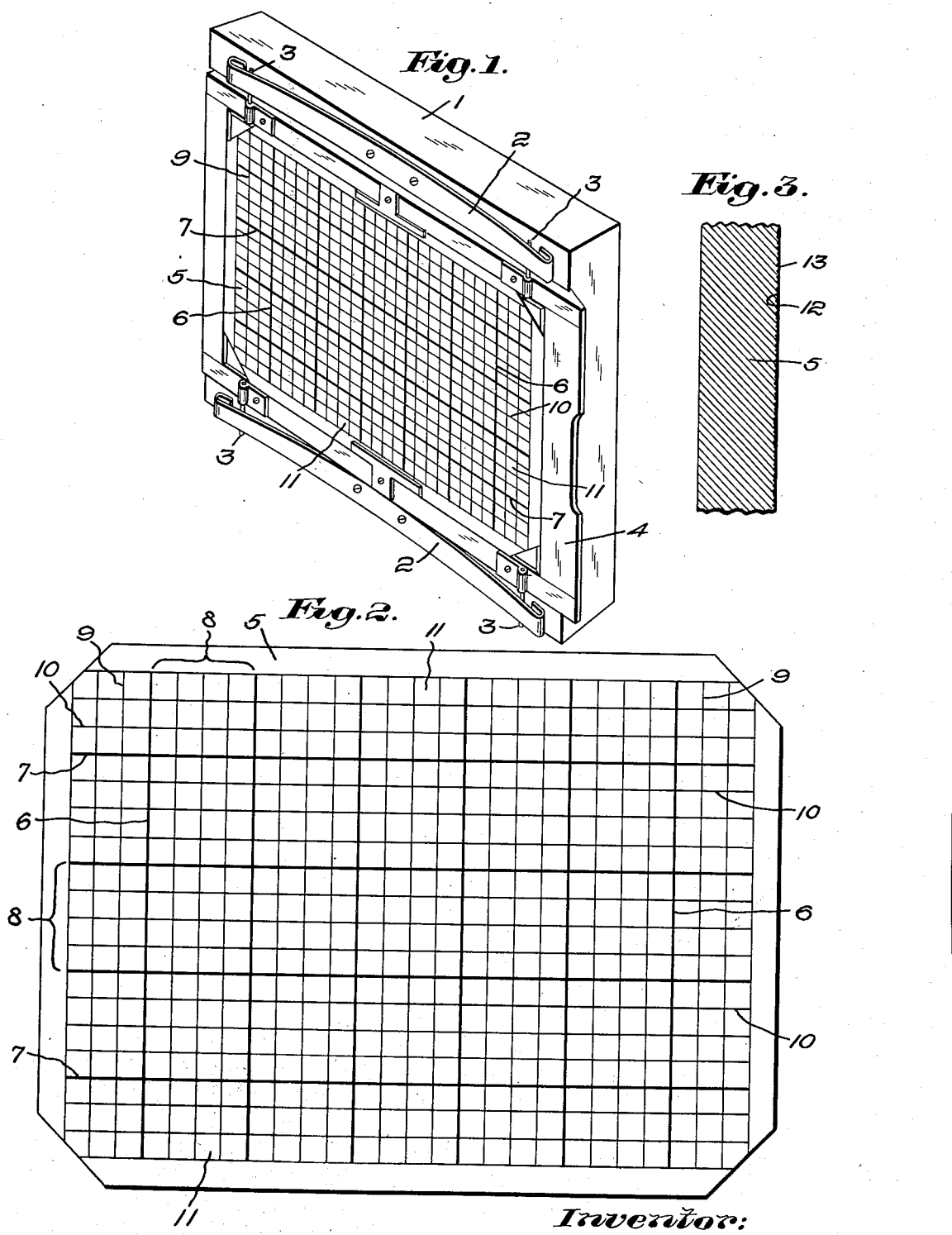

Patented Jan. 1, 1935

1,985,925

UNITED STATES PATENT OFFICE 1,985,925

PHOTOGRAPHIC PLATE ELEMENT AND PROCESS OF PREPARING SAME

Jacob Herbert, Newton, Mass.

Application November 27, 1931, Serial No. 577,665

4 Claims. (Cl. 101—426)

This application is a refiling of my original application Ser. No. 411,130, filed December 2, 1929, but with a more complete disclosure, and is therefore in part a continuation of said original application.

This invention relates to producing permanent ink delineations and designs on glass, for example, in connection with the art of photography, and is more particularly concerned with the process or method of applying, to a translucent plate element, lines of markings that visually delineate the photographic field in terms of linear units of measurement, and also is concerned with the resultant product or translucent plate element.

In photography for commercial and industrial use including engraving, architectural photography, etc., a high degree of exactness of size and placement of the object on the photograph are essential to produce successful results. Only approximately and only roughly has this been effected in the past, and usually by the use of a hand rule in conjunction with a focusing surface, as, for example, the usual ground glass. Such procedure not only lacks in accuracy but requires much time and the results are not permanent.

In architectural photography, both of interiors and exteriors, not only must a camera be set up with accuracy (this is frequently difficult, because of the lack of guiding lines), but the view or object to be photographed must be placed for correct lines or so-called perfect perspective or drawing lines. This is true also in photographing objects such as furniture for illustration and advertising. In photographing for engraving work, extreme exactitude of scale and placement is imperative.

An important object of the present invention is to provide a focusing surface scaled in subdivisions preferably in the vertical and horizontal, and in terms of linear measurement, without impairing the clarity of focusing vision, whereby the focusing of the object on the focusing surface to secure accurate sizing and placement on the photographic surface may be effected visually with reference to a focusing surface delineating known linear values and interrelation. The invention therefore relates both to the method whereby the marking or delineation is effected and also to the resulting article or product.

Referring to the drawing wherein is represented a single embodiment only of the product resulting from my process,—

Fig. 1 is a perspective view of the back of a view camera and of the so-called ground glass holder with a ground glass treated in accordance with my invention;

Fig. 2 is a plan view of the said "ground glass"; and

Fig. 3 is a vertical section on a greatly enlarged scale of a small portion of the ground glass to one surface of which the delineations or markings have been applied.

Referring only to the single embodiment of the invention here illustrated, the back of the bellows portion of a view camera is indicated at 1. This may be of any usual construction. It is represented as having secured thereto the springs 2, 2, which receive the pins 3 upon the frame or holder 4 for the "ground glass". Said parts may be of any suitable construction and need not be further described excepting to state that, in accordance with the usual practice, the film or other surface upon which exposure is to be made, is inserted between the back 1 and the frame 4 which is drawn as usual away from the back 1 of the camera, whereupon the film or other receiving surface is inserted and the springs 2 act to restore the holder 4 to position.

The so-called "ground glass" or its equivalent translucent plate element is represented in Figs. 1, 2 and 3 at 5. In the course of my experimentation, I have ascertained that the ordinary ground glass is not satisfactory and will not receive the lines or delineations in such manner as to retain them permanently, and this is mainly due to the fact that such ordinary ground glass is a rolled glass and is therefore of uneven thickness at points throughout its area. Such unevenness prevents the application to the surface of the glass of the demarcations or lines under pressure, because the application of heavy pressure breaks the glass. I have found that in order to make the delineations or markings permanent, they must be applied under heavy pressure. If heavy pressure be resorted to, as, for example, one thousand pounds more or less, such pressure would break, substantially invariably, the usual ground glass made by a rolling process. Accordingly, I employ plate glass indicated at 5, and the surface thereof may be ground in the usual manner. Such a glass will sustain the heavy pressure which I find it highly desirable to employ in applying the delineations or markings to the surface thereof and in such a way as actually to embed those markings into the surface of the glass.

The markings may, of course, be widely varied within the scope of my invention, but in the disclosed embodiment of the invention I have represented vertical lines 6 and horizontal lines 7 so spaced as to divide the field of glass into rectangular units 8 of known linear value, as, for example, one square inch. That is to say, preferably the horizontal and vertical lines bounding each rectangular unit are one inch in length, being, of course, continuous from edge to edge of the glass 5. Preferably the squares 8 are in turn visually sub-divided by a series of finer and more closely but uniformly spaced vertical and horizontal lines 9, 10, spaced for example, one quarter of an inch apart and sub-dividing the square 8 into small squares 11 having bounding sides one quarter of an inch long. The main division lines 6, 7 which bound the larger squares are preferably slightly heavier than the more closely spaced lines 9, 10, so as to enable the eye quickly to estimate the area covered by a group of squares 8 within which an object to be photographed appears on the surface of the ground plate glass and enables the camera to be focused to bring an object within a desired delineated area on the ground plate glass.

The said vertically and horizontally delineated lines 5, 6, 9, 10 enable the camera to be set up and focused so as to bring the lines of the object to be photographed, as in architectural or display photography, into correct and proper relation to the vertical and the horizontal on the ground glass, and therefore on the photographic surface of the plate or film. In photographing for engraving work, the relatively fine sub-divisions 11 of the squares 8 enable the object to be focused on the ground plate glass to the exact dimension and placement required by the photographic reproduction.

In applying the markings to the ground plate glass, I employ a waterproof ink, applying such ink to the under or co-acting surface of the platen of the press. The ground plate glass 5 is laid in the press so that the face of the platen having the said lines of waterproof ink thereon may be brought into contact with the said plate glass 5. I preferably employ very great pressure, as, for example, one thousand pounds to the platen and the result is that the waterproof ink becomes actually embedded in the structure of the glass as indicated in Fig. 3. In said Fig. 3, I have exaggerated at 12 the normal ground glass surface of the plate glass, and at 13 have indicated one of the waterproof ink lines. When the waterproof ink is applied in the manner described, it is permanently retained by the surface of the glass, thereby providing a plate glass the markings of which will not become obscured or impaired in any way.

Having thus described one embodiment of my invention and the best mode known to me for practising the method of the invention, I desire it to be understood that although specific terms are employed, they are used in a generic and descriptive sense and not for purposes of limitation, the scope of the invention being set forth in the following claims.

I claim:

1. That process of marking ground glass and like translucent plate elements for cameras consisting of providing a ground plate glass and applying lines or other marks thereto under such heavy pressure as to impress said lines permanently into all surface irregularities of the structure of the said glass and to insure a direct and intimate bond of said lines and the glass throughout the entire extent of the lines, thereby permanently delineating visually the glass in the desired pattern.

2. That process of marking ground glass and like translucent plate elements consisting of providing a ground plate glass and applying waterproof ink lines or other marks thereto under such heavy pressure as to impress said lines permanently into all surface irregularities of the structure of the said glass and to insure a direct and intimate bond of said lines and the glass throughout the entire extent of the lines, thereby permanently delineating visually the glass in the desired pattern.

3. As a new article of manufacture, a translucent glass plate element, said article comprising a sheet of ground plate glass having lines or other marks of waterproof ink so impressed upon the glass that all surface irregularities of the structure of the glass along the zone of said line are filled by the ink, the ink having direct and intimately bonded relation with the glass structure throughout the entire extent of the lines, said lines thereby providing permanent delineation of the glass in the desired pattern and form.

4. As a new article of manufacture, a focusing plate for a camera, consisting of a sheet of ground plate glass having a focusing field delineated thereon, and having visually indicated areal units and subunits within said field, said field and its units and subunits formed by waterproof ink lines impressed upon said plate glass, in the desired arrangement and configuration, and in which the ink has penetrated and occupies all underlying surface irregularities of the glass thereby forming a direct uninterrupted and substantially permanent bond with the glass structure throughout the entire extent of the lines.

JACOB HERBERT.